(12) United States Patent
Kawasaki et al.

(10) Patent No.: US 8,698,992 B2
(45) Date of Patent: Apr. 15, 2014

(54) NORMALLY BLACK MODE ACTIVE MATRIX LIQUID CRYSTAL DISPLAY DEVICE WHEREIN A PART OF AN EDGE OF A PROTECTION TRANSISTOR PROVIDED IN A FRAME PORTION IS COVERED WITH A TRANSPARENT ELECTRODE

(75) Inventors: Taku Kawasaki, Kanagawa (JP); Teruaki Suzuki, Kanagawa (JP); Shinichi Nishida, Kanagawa (JP)

(73) Assignee: NLT Technologies, Ltd., Kanagawa (JP)

( * ) Notice: Subject to any disclaimer, the term of this patent is extended or adjusted under 35 U.S.C. 154(b) by 952 days.

(21) Appl. No.: 12/269,083

(22) Filed: Nov. 12, 2008

(65) Prior Publication Data

US 2009/0128721 A1 May 21, 2009

(30) Foreign Application Priority Data

Nov. 16, 2007 (JP) .................................. 2007-297822

(51) Int. Cl.
*G02F 1/1345* (2006.01)
*G02F 1/1333* (2006.01)

(52) U.S. Cl.
USPC ............................................ 349/149; 349/40

(58) Field of Classification Search
USPC .................................................. 349/149–152
See application file for complete search history.

(56) References Cited

U.S. PATENT DOCUMENTS

| | | | | |
|---|---|---|---|---|
| 2001/0052957 | A1* | 12/2001 | Ohe et al. | 349/124 |
| 2003/0227594 | A1* | 12/2003 | Hirakata et al. | 349/153 |
| 2005/0185117 | A1* | 8/2005 | Kashima | 349/97 |
| 2005/0253984 | A1* | 11/2005 | Kim et al. | 349/106 |
| 2006/0244893 | A1* | 11/2006 | Oda | 349/151 |
| 2007/0296674 | A1* | 12/2007 | Aoki et al. | 345/94 |
| 2008/0049156 | A1* | 2/2008 | Kim et al. | 349/40 |

FOREIGN PATENT DOCUMENTS

| | | |
|---|---|---|
| JP | 9-73101 | 3/1997 |
| JP | 2001-183696 | 7/2001 |
| JP | 2002-156653 | 5/2002 |
| JP | 3327508 | 7/2002 |

OTHER PUBLICATIONS

JP Office Action dated Jul. 31, 2012, with English translation; Application No. 2007-297822.

* cited by examiner

*Primary Examiner* — Paul Lee
(74) *Attorney, Agent, or Firm* — Young & Thompson

(57) ABSTRACT

Disclosed is an active matrix liquid crystal display device including: an active matrix liquid crystal display device of a normally black mode which includes an active matrix substrate and an opposed substrate and in which a black matrix is not provided on the opposed substrate, wherein a gap between opaque electrodes which are closely located and whose electric potentials are different from each other in a frame portion around a display area of the active matrix substrate is covered with a constant-potential transparent electrode arranged in an upper layer of the gap.

10 Claims, 18 Drawing Sheets

NORMALLY BLACK MODE ACTIVE MATRIX LIQUID CRYSTAL DISPLAY DEVICE WHEREIN A PART OF AN EDGE OF A PROTECTION TRANSISTOR PROVIDED IN A FRAME PORTION IS COVERED WITH A TRANSPARENT ELECTRODE

This application is based upon and claims the benefit of priority from Japanese Patent Application No. 2007-297822, filed on Nov. 16, 2007, the disclosure of which is incorporated herein in its entirety by reference.

TECHNICAL FIELD

The present invention relates to an active matrix liquid crystal display device and in particular, relates to an active matrix liquid crystal display device having a structure in which a black matrix is not provided on an opposed substrate.

BACKGROUND ART

In an active matrix liquid crystal display device, a plurality of scanning lines and a plurality of signal lines are provided in one substrate. A display pixel is provided at each of intersection points of the signal lines and the scanning lines. Each of the display pixels includes a switching element and can individually apply an electric potential to a liquid crystal. A surrounding area (frame portion) which does not include the display pixel is arranged around the display area which includes each of the display pixels. An opposed substrate includes a black matrix in order to prevent transmission of a backlight (light leakage) in the frame portion.

In order to reduce a production cost of the above-mentioned liquid crystal display device, it is effective to eliminate the black matrix provided on the opposed substrate. For that purpose, a laminated pattern including color layers is provided in the frame portion to function as a light shielding layer. However, light shielding ability of the light shielding layer that is formed by using the laminated pattern including color layers is insufficient. Therefore, in a liquid crystal display device of a normally white mode using a TN (Twisted Nematic) system, the frame portion may be colored. As a result, sufficient display quality can not be obtained.

To solve the problem above described, Japanese Patent Registration No. 3327508 (patent document 1) discloses a liquid crystal display device having a structure in which a light shielding layer composed of an opaque electrode 16 covers a gap between scanning lines or a gap between signal lines (in FIG. 16, a gap between signal lines) that is arranged in a surrounding area (frame portion) as shown in FIG. 16. Japanese Patent Application Laid-Open No. 1997-73101 discloses a liquid crystal display device having a structure in which a transparent electrode is arranged in an upper layer of an opaque electrode in order to improve transmissivity of a liquid crystal panel and reduce light reflection from a display surface.

In recent years, a liquid crystal display device of a normally black mode such as an IPS (In-Plane Switching) system has been developed as a display device having a wide view angle display. In the display device, black is displayed in an area where an electric field is not formed between wiring lines although a light shielding layer does not exist in the area. Therefore, the above-mentioned liquid crystal display device can maintain sufficient display quality by using only a light shielding layer made of laminated color layers. However, an electric field is generated between the wiring lines in a place at which two kinds of wiring lines that have a different electric potential from each other cross. As a result, a light transmits through only the portion. Therefore, a light leakage with a specific pattern occurs at the frame portion disadvantageously.

An intersection of wiring lines each having a different electric potential is necessarily required when a protection transistor in order to prevent electrostatic breakdown of a switching element is arranged or wiring lines are laid in the surrounding area (frame portion).

For example, as shown in FIG. 17, in the frame portion around the display area, when a common electrode 3 is arranged on a portion in which a plurality of scanning lines 2 are provided, a strong electric field is generated at an intersection portion between the scanning line 2 and the common electrode 3 as indicated by arrows shown in FIG. 17. As shown in FIG. 18 which shows a cross-sectional structure along a line F1-F2 in FIG. 17, the strong electric field penetrates a liquid crystal layer 10. Therefore, a liquid crystal rotates and causes light leakage.

The light leakage can be avoided by providing a light shielding layer composed of an opaque electrode 16 as shown in the patent document 1 (FIG. 16). However, two wiring lines are stacked at the intersectional portion. When the light shielding layer composed of the opaque electrode is added at the portion in addition to the stacked wiring lines, manufacturing processes increase.

SUMMARY

An exemplary object of the present invention is to provide an active matrix liquid crystal display device in which light leakage in a frame portion around a display area can be reduced.

An active matrix liquid crystal display device according to an exemplary aspect of the invention includes an active matrix liquid crystal display device of a normally black mode which includes an active matrix substrate and an opposed substrate and in which a black matrix is not provided on the opposed substrate, wherein a gap between opaque electrodes which are closely located and whose electric potentials are different from each other in a frame portion around a display area of the active matrix substrate is covered with a constant-potential transparent electrode arranged in an upper layer of the gap.

BRIEF DESCRIPTION OF THE DRAWINGS

Exemplary features and advantages of the present invention will become apparent from the following detailed description when taken with the accompanying drawings in which.

EXEMPLARY EMBODIMENT

Exemplary embodiments of the present invention will now be described in detail in accordance with the accompanying drawings.

Figure 1:
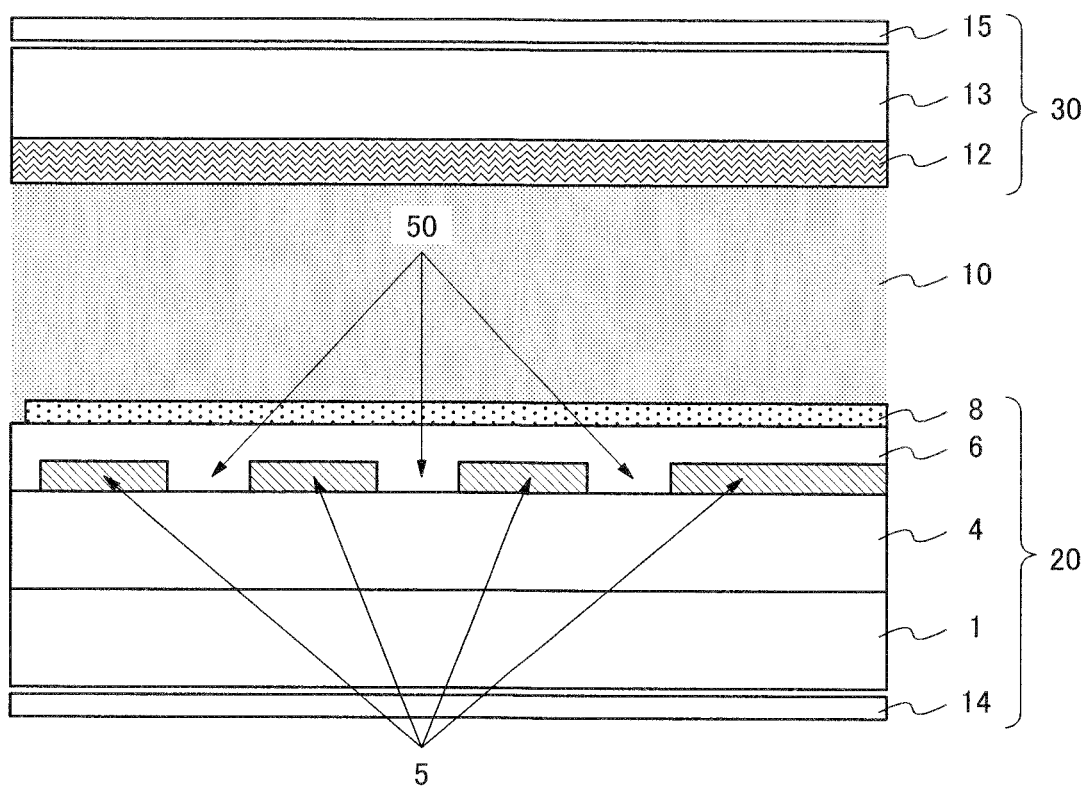
FIG. 1 is a cross sectional view illustrating a structure of an active matrix liquid crystal display device of a exemplary embodiment of the present invention.

One preferred exemplary embodiment of the present invention will be described referring to FIG. 1. FIG. 1 is a cross-sectional view illustrating a structure of an active matrix liquid crystal display device of an exemplary embodiment of the present invention.

As shown in FIG. 1, the present invention relates to an active matrix liquid crystal display device with a normally black mode in which a black matrix is not provided to an opposed substrate 30. Further, the device includes a following structure.

In a frame portion around a display area, a gap 50 between opaque electrodes (for example, signal lines 5) which are closely located on an active matrix substrate 20 and whose electric potentials are different from each other is covered with constant-potential transparent electrode 8 arranged in an upper layer thereof.

An edge portion of the transparent electrode 8 having constant-potential that covers the gap between the opaque electrodes whose electric potentials are different from each other may be arranged on the opaque electrode and the constant-potential transparent electrode and the opaque electrode may be arranged to overlap each other by 1 μm or more (preferably, 2 μm or more) (for example, refer to an overlapping amount and an overlap part 42 in FIG. 5 and FIG. 6 described later).

A scanning line may be connected to an opaque metal layer that forms a signal line on a scanning line extracting side of the frame portion. Moreover, in the frame portion, the opaque metal layer may be extended in a direction substantially orthogonal to a direction in which the scanning line is extended and may overlaps with one of scanning lines adjacent to the connected scanning line (for example, refer to FIG. 9 described below). With respect to the liquid crystal display devices having above mentioned structures, a part of the edge of the constant-potential transparent electrode 8 which is arranged so as to cover the gap between the opaque electrodes each having a different electric potential may be provided on the opaque metal layer mentioned above.

The present invention is applicable to a liquid crystal display device of the normally black mode which does not include black matrix on an opposed substrate in general. In particular, when the present invention is applied to IPS system which is a liquid crystal mode with a wide view angle or a VA (Vertical Alignment) system, a liquid crystal display device having high performances can be provided at low cost.

First Example

Figure 2:
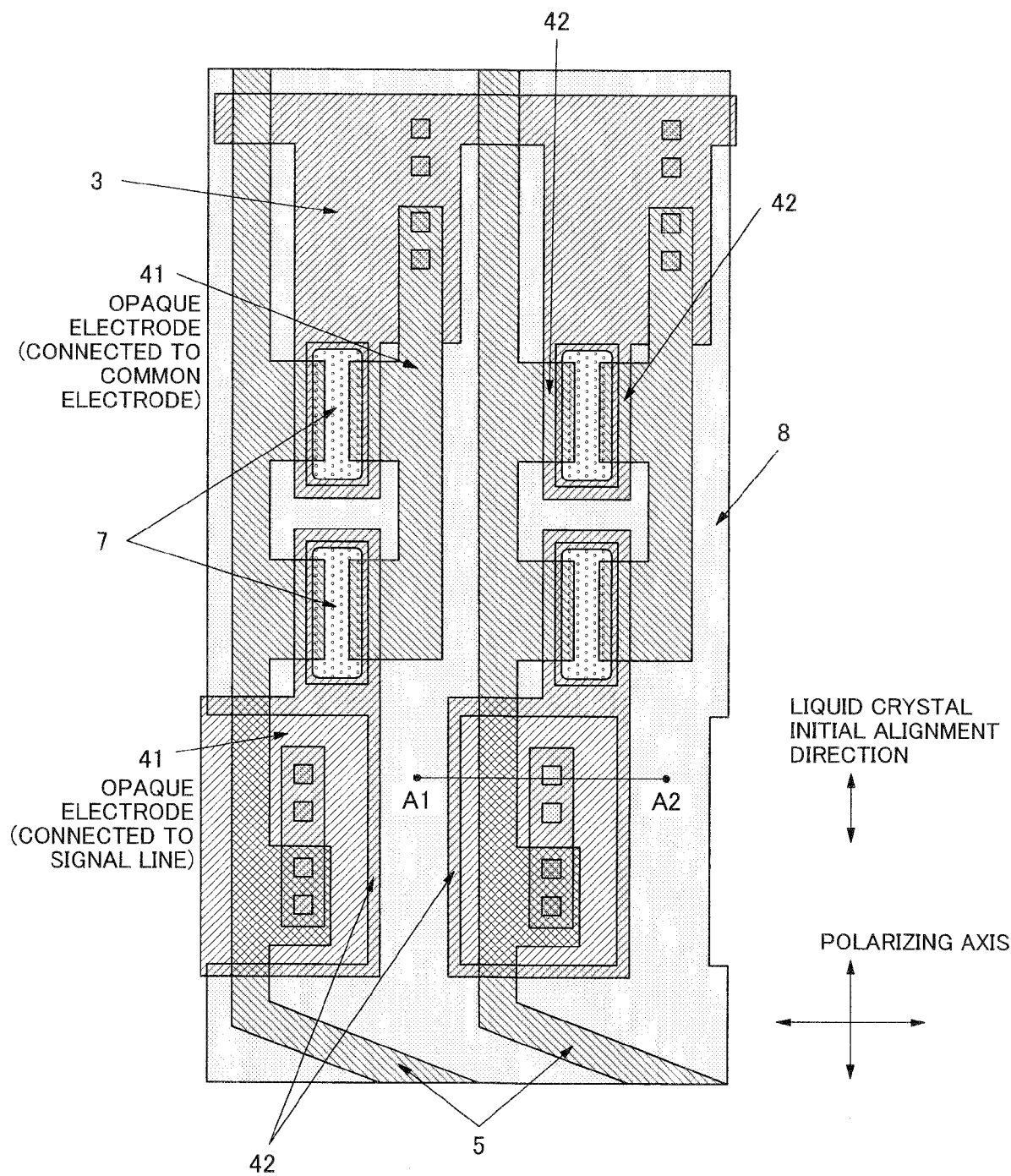
FIG. 2 is a plan view illustrating a structure of a neighborhood of a protection transistor that is connected to a signal line in a frame portion of the active matrix liquid crystal display device according to a first example of the present invention.
Figure 3:
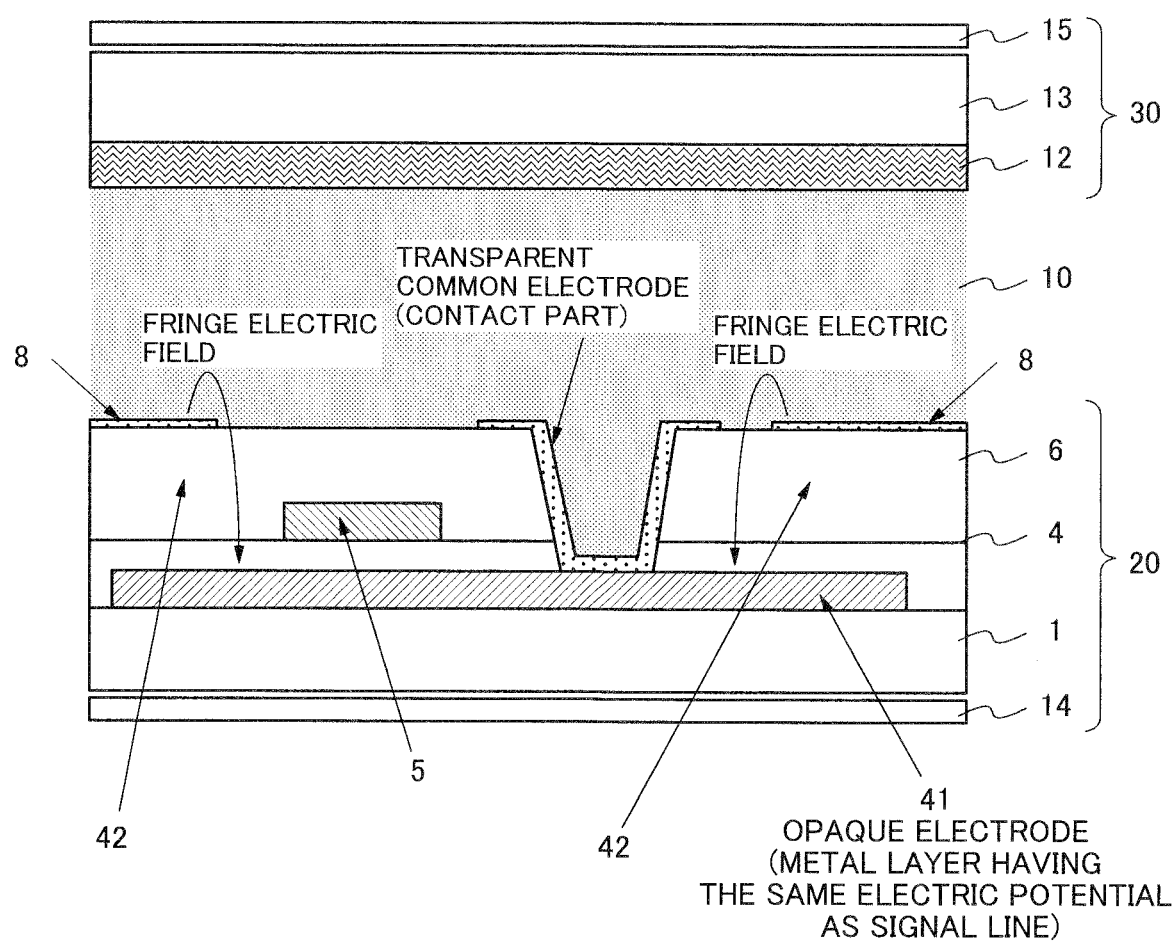
FIG. 3 is a cross-sectional view illustrating a cross-sectional structure of a line A1-A2 in FIG. 2.
Figure 4:
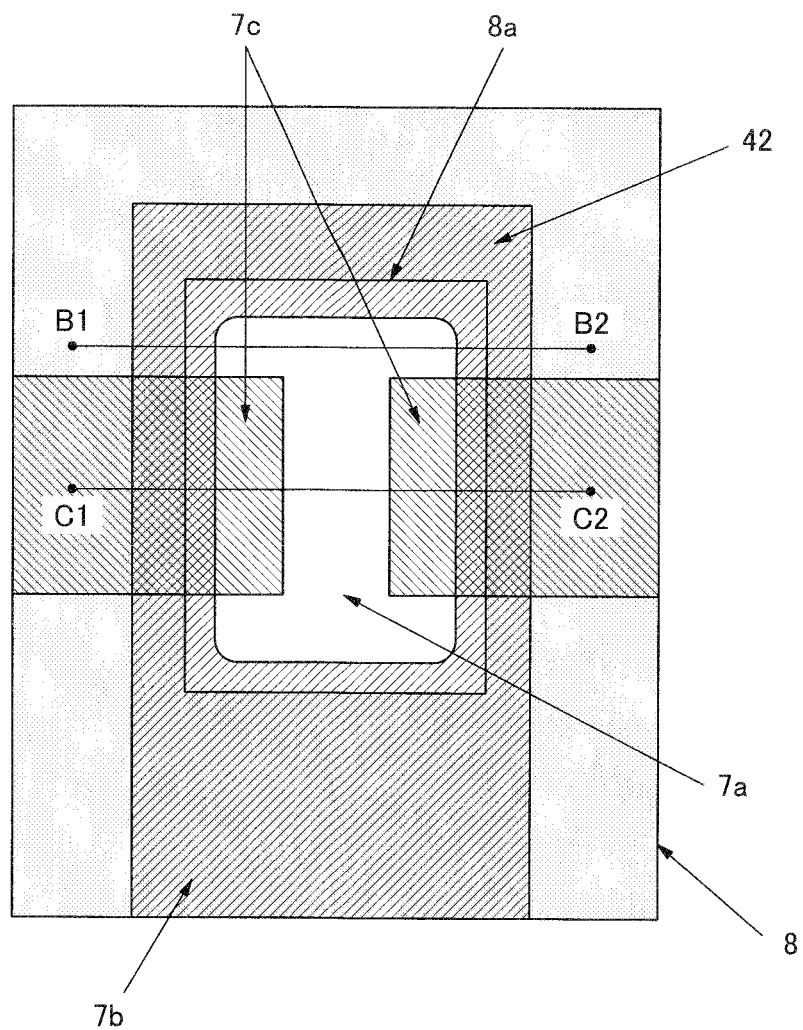
FIG. 4 is a plan view illustrating a detailed structure of the protection transistor in the frame portion of the active matrix liquid crystal display device according to the first example of the present invention.
Figure 7:
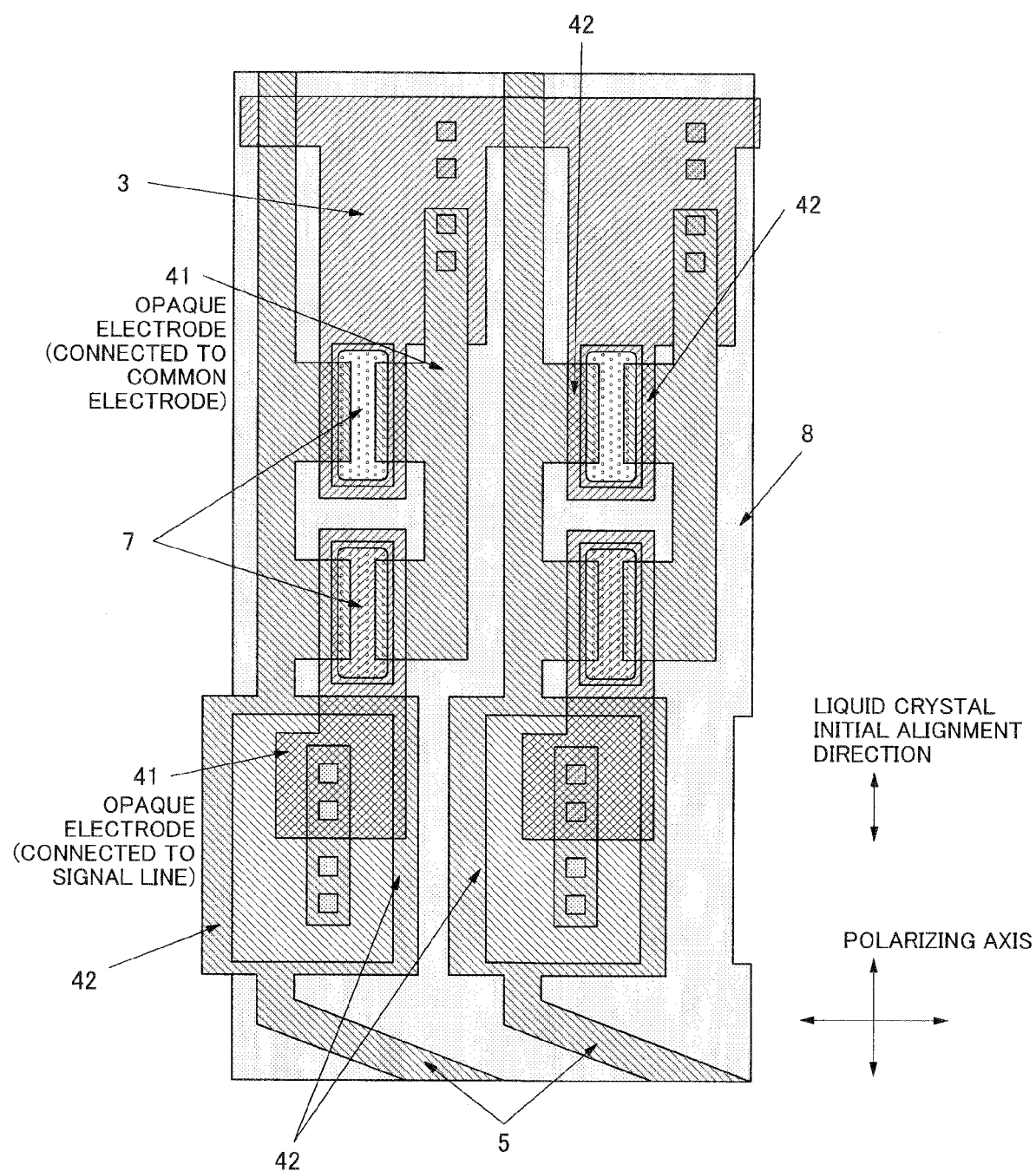
FIG. 7 is a plan view illustrating another structure of the frame portion of the active matrix liquid crystal display device according to the first example of the present invention.
Figure 8:
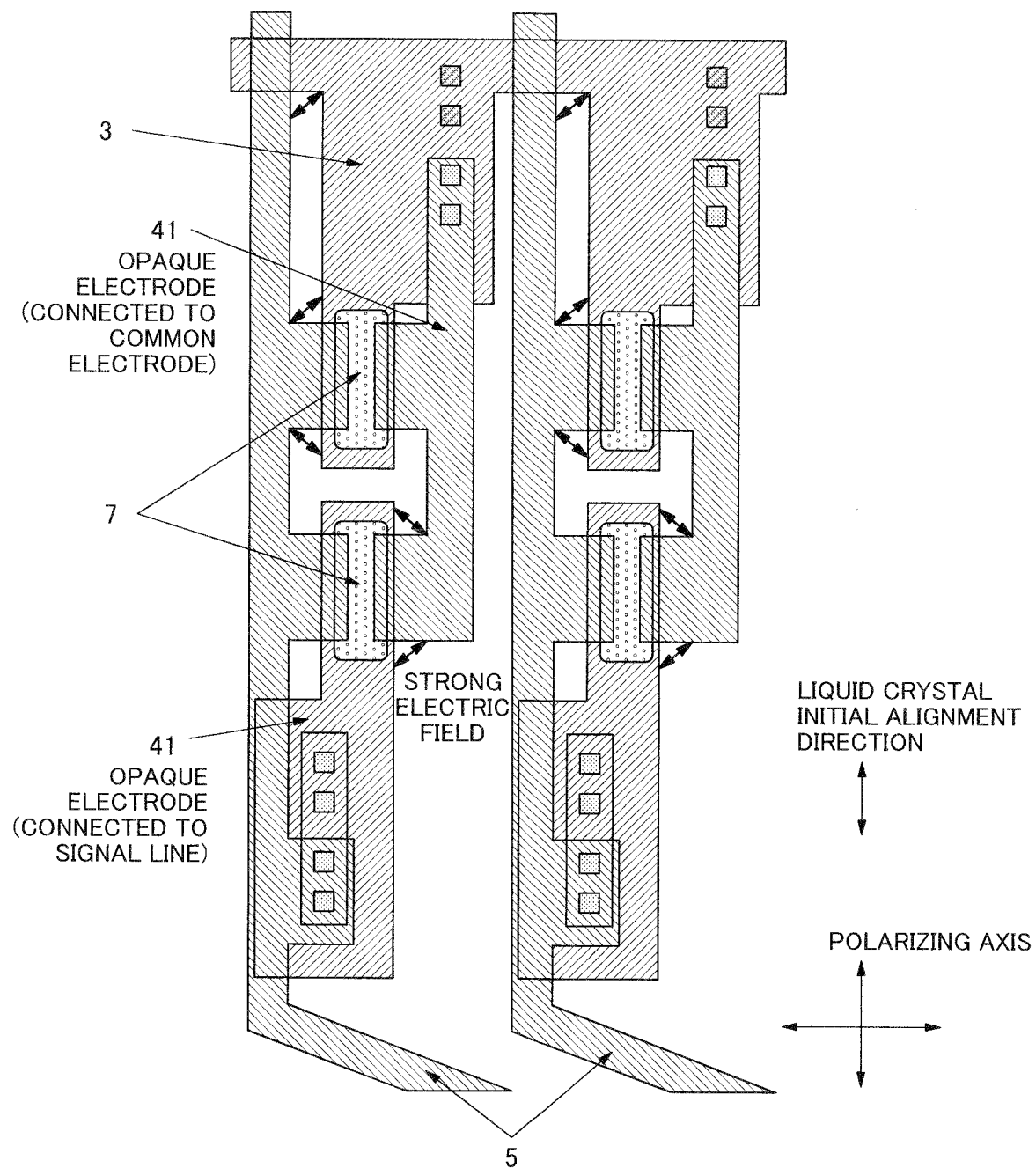
FIG. 8 is a plan view illustrating an electric field which is generated in the neighborhood of the protection transistor and an intersectional portion of wiring lines.

The exemplary embodiment of the present invention mentioned above will be described in more detail. An active matrix liquid crystal display device according to a first example of the present invention will be described with reference to FIGS. 2 to 8. FIG. 2 is a plan view illustrating a structure in the neighborhood of a protection transistor that is connected to a signal line in a frame portion around a display area of the active matrix liquid crystal display device according to the first example of the present invention. FIG. 3 is a cross-sectional view illustrating a cross-sectional structure of a line A1-A2 in FIG. 2. FIG. 4 is a plan view illustrating a detailed structure of the protection transistor provided in the frame portion. FIG. 5 is a view illustrating a cross-sectional structure of a line B1-B2 in FIG. 4. FIG. 6 is a view illustrating a cross-sectional structure of a line C1-C2 in FIG. 4. FIG. 7 is a plan view illustrating another structure of the frame portion. FIG. 8 is a plan view illustrating an electric field which is generated in the neighborhood of the protection transistor and in an intersectional portion of wiring lines.

Figure 5:
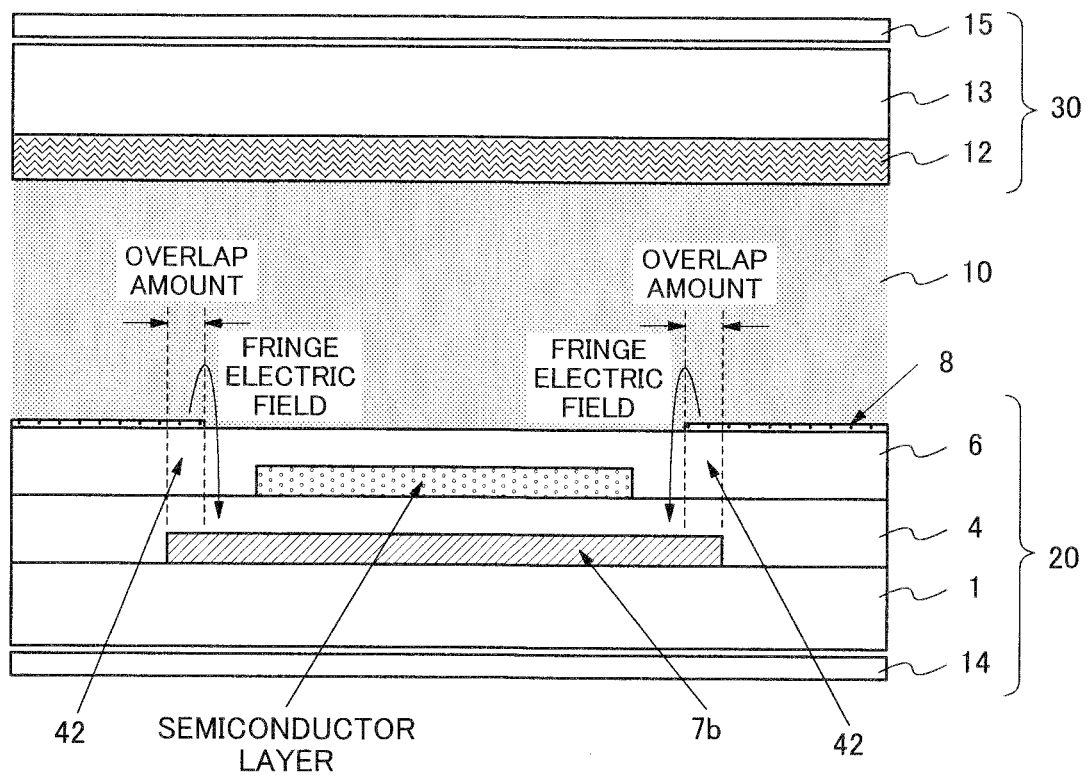
FIG. 5 is a cross-sectional view illustrating a cross-sectional structure of a line B1-B2 in FIG. 4.
Figure 6:
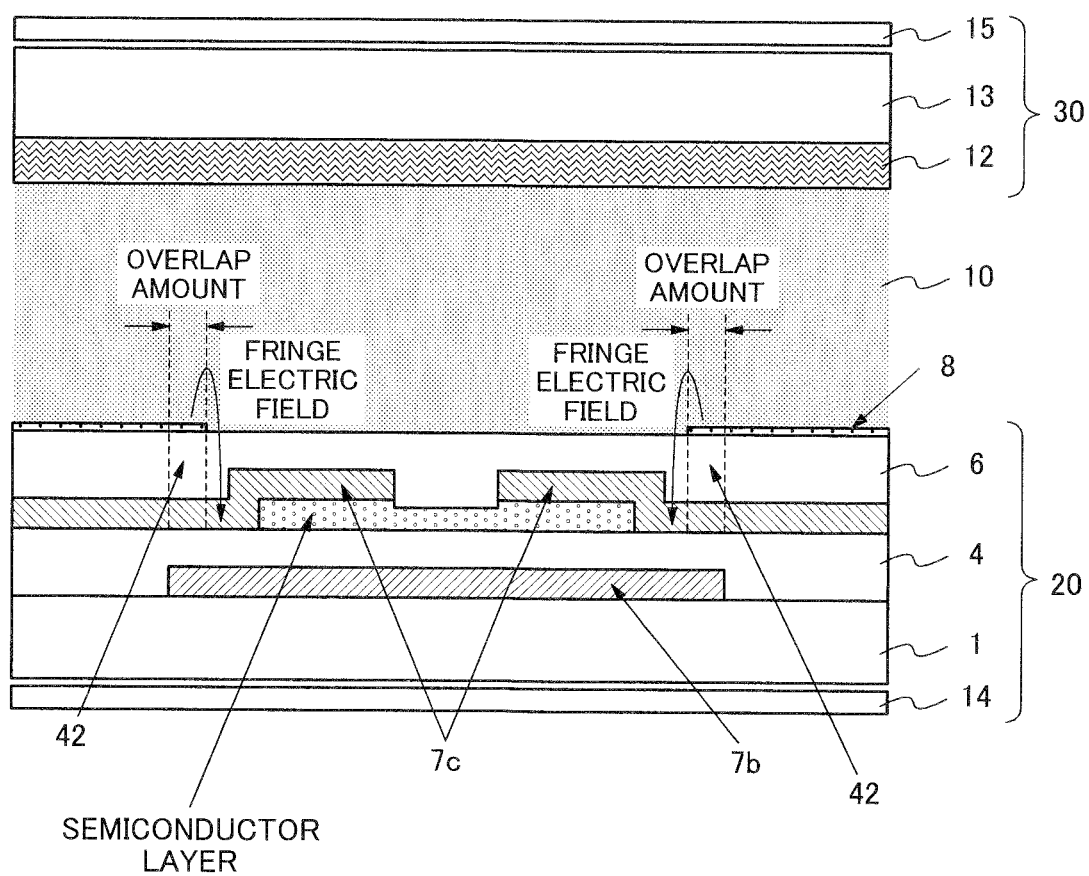
FIG. 6 is a cross-sectional view illustrating a cross-sectional structure of a line C1-C2 in FIG. 4.

As shown in FIG. 3, FIG. 5 and FIG. 6, the active matrix liquid crystal display device includes one substrate (active matrix substrate 20), the other substrate (opposed substrate 30) and a liquid crystal (liquid crystal layer 10) sandwiched between both substrates and also includes an end seal 11 (refer to FIG. 14 described below) which bonds the substrates and seals the liquid crystal therebetween. The active matrix substrate 20 includes a polarizing plate 14, a substrate 1, an insulation layer 4, an insulation layer 6 and a constant-potential transparent electrode 8. The opposed substrate 30 includes a color layer 12, a substrate 13 and a polarizing plate 15. Moreover, a matrix of display pixels each having a switching element such as a TFT (Thin Film Transistor) are arranged in the active matrix substrate 20, and various color layers 12 corresponding to the display pixels are arranged in the opposed substrate 30.

A scanning line (i.e. "gate line") and a signal line 5 (i.e. "data line") that are composed of a metal or the like are formed in the active matrix substrate 20. The scanning line and the signal line are extended in an area (hereinafter, referred to as a frame portion) around a display area including a display pixel and connected to a terminal electrode arranged at an edge of the frame portion. The constant-potential transparent electrode 8 composed of an ITO (Indium Tin Oxide) or the like is formed in an upper layer of the scanning line and the signal line 5.

Here, a liquid crystal display device of a normally black mode can maintain sufficient display quality even when a black matrix is not provided in the opposed substrate 30, if an electric field is not applied to a liquid crystal of the frame portion. However, when a strong electric field is generated in the neighborhood of the protection transistor 7 provided in the frame portion of the active matrix substrate 20 or in an intersectional portion of wiring lines each having a different electric potential, alignment directions of the liquid crystal changes. As a result, a backlight penetrates and a light leakage occurs in the frame portion. Thereby, sufficient display quality can not be obtained. When the light shielding layer shown in the patent document 1 is arranged in the liquid crystal display device, additional production processes are required to form a light shielding layer in addition to the above-mentioned scanning line and signal line. Such additional processes increase production cost.

Accordingly, in the first example, a method for blocking the strong electric field is proposed. In the liquid crystal display device of the normally black mode, a transparent electrode (the constant-potential transparent electrode 8) formed in the upper layer of the active matrix substrate 20 is used for a light shielding. A new light shielding layer which covers the frame portion of the active matrix substrate 20 is not formed. Thereby, the strong electric field in the neighborhood of the protection transistor or the intersectional portion of wiring lines in the frame portion is shielded. Hereinafter, it will be described specifically with reference to a drawing.

FIG. 2 indicates a configuration of the neighborhood of the protection transistor connected to a signal wiring line in the frame portion of the active matrix liquid crystal display device of the first example. As shown in FIG. 2, each of the signal lines 5 that are drawn upward from the lower part of the figure to the upper left thereof is connected to the two protection transistors 7.

The protection transistor 7 is provided to prevent a trouble due to an insulation breakdown or the like. When a static electrical charge is generated in the signal line 5 in manufacturing processes of a liquid crystal panel, the protection transistor 7 discharges the electric charge. A gate electrode and a source electrode of one of the protection transistors 7 (protection transistor 7 shown in the lower part of FIG. 2) are connected to the signal line 5 and a drain electrode thereof is connected to the common electrode 3. The gate electrode and the drain electrode of the other protection transistor 7 (protection transistor 7 shown in the upper part of FIG. 2) are connected to the common electrode 3 and the source electrode thereof is connected to the signal line 5. When a liquid crystal is held between the opposed substrate 30 and the protection transistor 7, the liquid crystal layer 10 is formed on the protection transistor 7.

Here, since an electric potential of the signal line 5 is different from that of the common electrode 3, as shown in FIG. 8, the strong electric field horizontally directed is generated in the gap between the source electrode and the gate electrode, and the gap between the drain electrode and the gate electrode of the protection transistor 7. Additionally, the strong electric field horizontally directed is generated in the gap between the signal line 5 and the common electrode 3. When a dot inversion drive method is used to drive a liquid crystal display, the strong electric field horizontally directed is generated in the gap between the signal lines 5 that are adjacent to each other because positive and negative electric potentials are usually applied to the adjacent signal lines 5, respectively. Due to the strong electric field, a light leakage is generated at a portion in which the wiring lines or the electrode that is composed of a metal or the like (hereinafter, these are collectively called as an opaque electrode 41) does not exist.

Accordingly, in the first example, the gap between the opaque electrodes 41 which are closely located and whose electric potential are different from each other is covered with a transparent electrode (hereinafter, referred to as a constant-potential transparent electrode 8) whose electric potential is fixed to a common electric potential.

In the configuration mentioned above, since the strong electric field generated in the neighborhood of the protection transistor 7 and in the intersectional portion of wiring lines is shielded with the constant-potential transparent electrode 8, the strong electric field does not penetrate into the liquid crystal layer 10. Accordingly, the black state is maintained based on the relationship between the polarizing plate 15 and the liquid crystal layer 10. Therefore, in the first example, the light leakage from the frame portion does not occur and high display quality can be maintained.

The basic structure of the first example is described above. When the constant-potential transparent electrode 8 mentioned above is arranged, an electric field (fringe electric field) is generated between an edge of the constant-potential transparent electrode 8 and the opaque electrode 41. Accordingly, in the first example, in order to avoid influence due to the fringe electric field, the constant-potential transparent electrode 8 is arranged as follows.

First, the edge of the constant-potential transparent electrode 8 lies so as to overlap with the opaque electrode 41 (here, signal line 5) arranged in a lower layer. Thereby, as shown in FIG. 3, even when the liquid crystal 10 is rotated by the fringe electric field generated at the edge of the constant-potential transparent electrode 8, the backlight light in the portion is shielded with the opaque electrode 41. Therefore, the light leakage can be prevented.

As shown in FIG. 4 that illustrates the detailed structure of the protection transistor 7, FIG. 5 that illustrates a cross-sectional structure of a line B1-B2 in FIG. 4 and FIG. 6 that illustrates a cross-sectional structure of a line C1-C2 in FIG. 4, in a channel part 7a of the protection transistor 7, a through-hole part 8a is provided in the constant-potential transparent electrode 8 and further the edge of the through-hole part 8a is arranged so as to overlap with the opaque electrode 41 (7b). Thereby, even when the liquid crystal is rotated by the fringe electric field generated at the edge of the constant-potential transparent electrode 8, the backlight light in the portion is shielded with the opaque electrode 41(7b). Therefore, the light leakage can be prevented. When the through-hole part 8a is arranged in the constant-potential transparent electrode 8 of the channel part 7a of the protection transistor 7, OFF characteristics of the transistor can be improved. As a result, increase of a consumed current due to a leak current generated via the protection transistor 7 can also be prevented.

In the first example, as a specific overlap amount, the edge of the constant-potential transparent electrode 8 is arranged so as to overlap with the opaque electrode 41 by 2 μm. It is confirmed that the light leakage caused by the rotation of the liquid crystal due to the fringe electric field generated at the edge of the constant-potential transparent electrode 8 can be suppressed sufficiently. Further, it is confirmed that if the overlap amount is equal to or greater than 1 μm, the light leakage can be suppressed effectively.

Further, the opaque electrode 41 which overlaps with the edge of the above-mentioned constant-potential transparent electrode 8 can be provided in any layer if the layout thereof is possible. For example, with respect to the through-hole part 8*a* that is provided to connect the signal line 5 to the gate electrode 7*b* of the protection transistor 7, an edge of the through-hole part may overlap with the opaque electrode 41 in a lower layer (for example, a metal layer in a layer in which the scanning line 2 connected to the signal line 5 exists) as shown in FIG. 2 and FIG. 3 (refer to an overlap part 42) or an edge of the through-hole part 8*a* may overlap with the opaque electrode 41 (for example, signal line 5) in an upper layer as shown in FIG. 7.

In the first example, since the light leakage in the neighborhood of the protection transistor 7 and in the intersectional portion of wiring lines in the frame portion can be reduced, it is not necessary to provide a light shielding layer such as a black matrix in the opposed substrate 30. Therefore, in the first example, cost reduction of a high-quality active matrix liquid crystal display device using the transparent electrode can be achieved.

In the above embodiment, the intersectional portion of the wiring lines and the neighborhood of the protection transistor 7 are covered with the constant-potential transparent electrode 8. However with respect to the portion in which a gap between wiring lines whose electric potential are different from each other is equal to or greater than 30 μm, it is not necessary to cover the gap. The reason is described as follows.

When the light leakage is reduced to black luminance, the light leakage becomes invisible. Accordingly, for example, when the invention is applied to a product whose contrast ratio is 800, it is enough to reduce luminance of the light leakage so as to be one eight hundredth (⅛₀₀) of white luminance. Here, since transmissivity can be reduced to be equal to or less than one hundredth (¹⁄₁₀₀) by using a lamination technology with which color layers are stacked, it is not necessary to shield the electric field in which a luminance that is one eighth (⅛) of the white luminance is generated, even if a black matrix is not provided. As an example, in a panel of a lateral electric field type in which interdigital electrode spacing is 8.5 μm and whose white voltage is 5 [V], the voltage which generates luminance having one eighth (⅛) of the white luminance is about 3 [V]. Accordingly, it is not necessary to shield the electric field that is equal to or smaller than 3/8.5 [V/μm]. Since an electric potential difference between the electrodes whose electric potential are different from each other is at most about 10 [V] in a surrounding area, when a distance between the electrodes whose electric potential are different from each other is at least x [μm] which meets an equation of 10/x<3/8.5, the shielding by covering with the constant-potential transparent electrode 8 is not necessary. In the inequality of x>10×8.5/3=28, it is necessary that the distance between the electrodes whose electric potential are different from each other is equal to or greater than 30 μm. It is confirmed that when the distance between the electrodes whose electric potential are different from each other is about 30 μm, the light leakage cannot be observed with eyes even when the shielding of the constant-potential transparent electrode 8 is not provided.

Second Example

Figure 9:
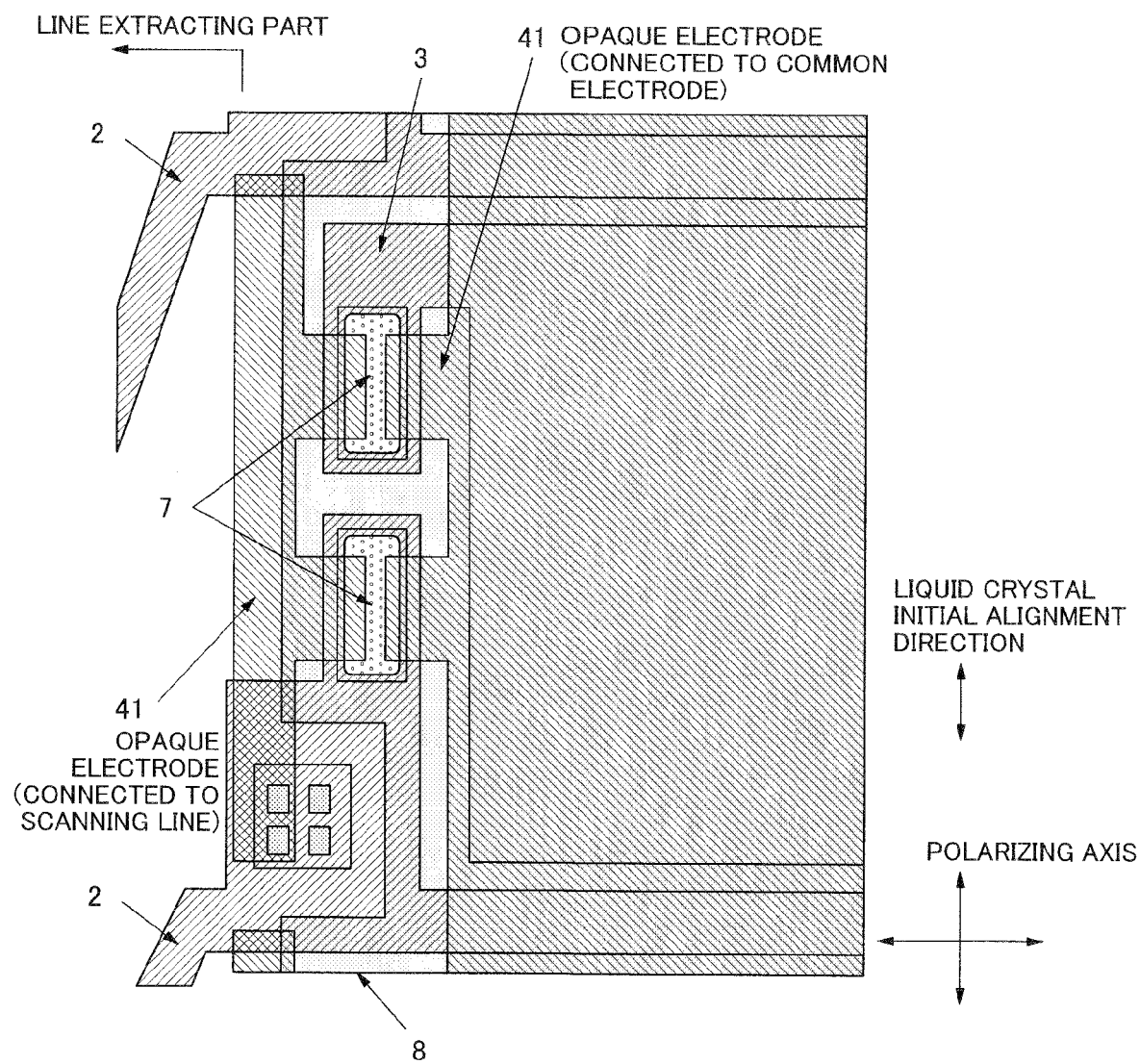
FIG. 9 is a plan view illustrating a structure near the protection transistor that is connected to a scanning line in the frame portion of the active matrix liquid crystal display device according to a second example of the present invention.
Figure 10:
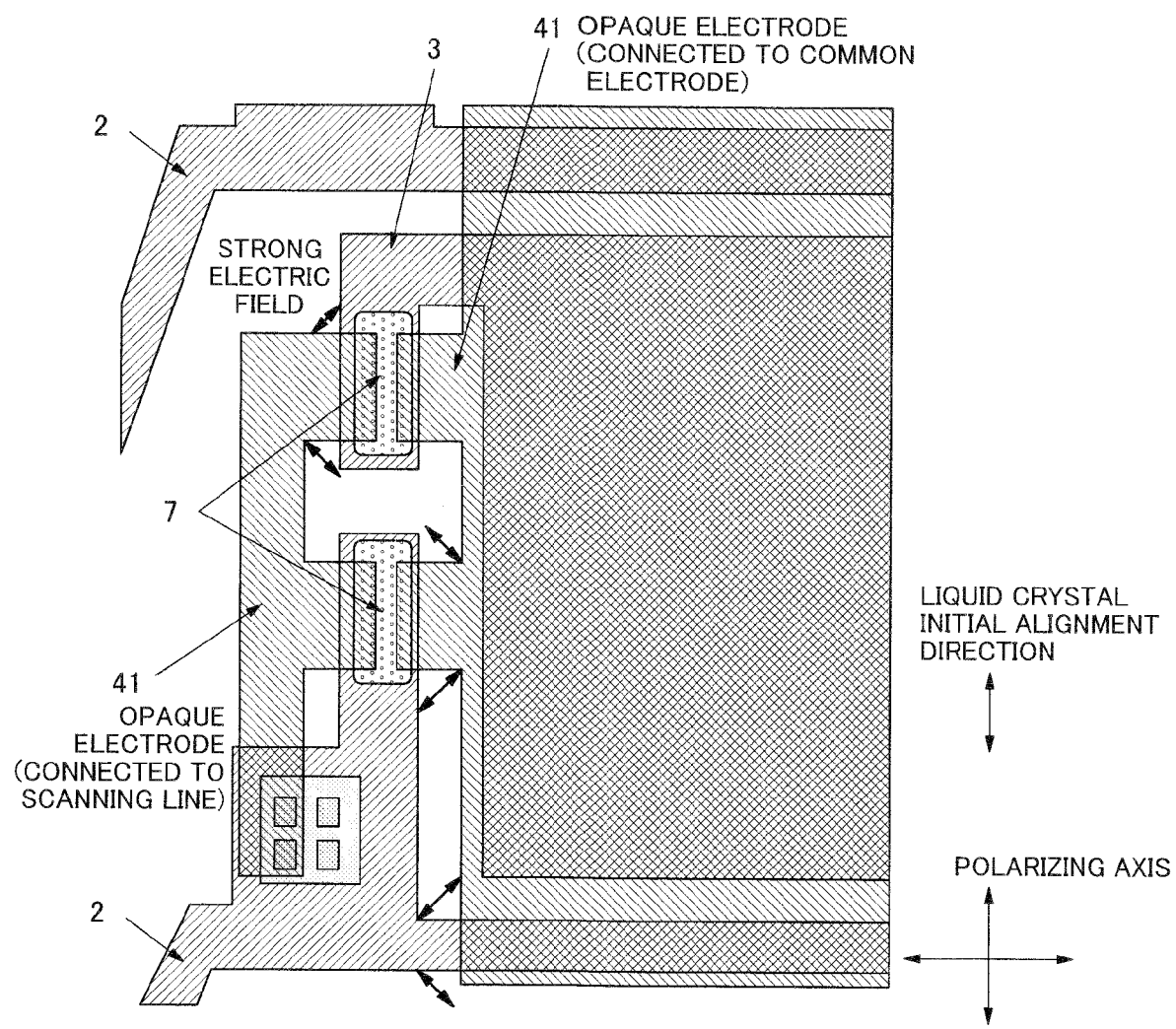
FIG. 10 is a plan view illustrating an electric field which is generated to the protection transistor and an intersectional portion of wiring lines.

Next, an active matrix liquid crystal display device according to a second example of the present invention will be described with reference to FIG. 9 and FIG. 10. FIG. 9 is a plan view illustrating a structure in the neighborhood of the protection transistor that is connected to the scanning line in the frame portion around a display area of the active matrix liquid crystal display device according to the second example. FIG. 10 is a plan view illustrating an electric field which is generated in the neighborhood of the protection transistor and in the intersectional portion of wiring lines.

In the above-mentioned first example, the structure in the neighborhood of the protection transistor that is connected to the signal line in the frame portion is described. As shown in FIG. 10, in the neighborhood of the protection transistor that is connected to the scanning line, the strong electric field horizontally directed is also generated in a gap between the source electrode and the gate electrode and a gap between the drain electrode and the gate electrode of the protection transistor 7. Additionally, a strong electric field horizontally directed is also generated in a gap between wiring lines whose electric potentials are different from each other.

Accordingly, in order to shield the horizontal electric field which is generated in the neighborhood of the protection transistor 7 and in the intersectional portion of wiring lines, as shown in FIG. 9, a constant-potential transparent electrode 8 whose electric potential is fixed to a common potential is arranged. In the second example, many parts thereof are the same as those of the first example. However, the different part from the first example is that the constant-potential transparent electrode 8 is not extended to a line extracting part.

The reason will be described. With respect to an electric potential of each of the scanning lines 2 which are adjacent to each other, an "ON" electric potential is applied during only a very short time in which a signal is written in a display pixel located along the scanning lines 2 and an "OFF" electric potential is applied while the display pixel holds a signal electric potential. Since a value of the signal writing time ranges from an inverse number of the total number of the scanning lines to one several hundredth of the holding time, the time in which the electric field is generated between the scanning lines 2 which are adjacent to each other and whose electric potentials are the "ON" electric potential for one scanning line and the "OFF" electric potential for the other scanning line is one several hundredth of the time in which the electric field is not generated between the scanning lines 2 whose electric potentials are the "OFF" electric potential for both scanning lines. Accordingly, the horizontal electric field is momentarily generated between the scanning lines which are adjacent to each other. The liquid crystal cannot rotate during such a moment and electric potentials of both scanning lines return to original equal electric potentials. Therefore, the liquid crystal quickly returns to the normally black state. The light leakage generated during such return can be ignored.

As description above, since it can be assumed that the adjacent scanning lines 2 have substantially equal electric potentials, it is not necessary to cover an upper layer with the constant-potential transparent electrode 8 for shielding an electric field.

Additionally, the scanning line 2 is connected to an opaque electrode 41 that is composed of a metal that forms a signal line via a contact hole in order to connect to the protection transistor. The opaque electrode 41 having a scanning line electric potential is extended to an adjacent scanning line portion. The effective horizontal electric field is not generated between two opaque electrodes 41 which include an electric potential of the adjacent scanning line. Therefore, the light leakage does not occur in the neighborhood thereof.

A part of an edge of the constant-potential transparent electrode 8 which is arranged so that the horizontal electric field which is generated between the gate electrode 7*b* and the source/drain electrode 7*c* of the protection transistor 7 is shielded is provided on the opaque electrode 41 having the scanning line electric potential. In such arrangement, the outside of the opaque electrode 41 having the scanning line electric potential can be an area in which the effective horizontal electric field between all the scanning lines 2 is not generated. Therefore, the light leakage does not occur in the neighborhood thereof.

In the second example, the light leakage in the neighborhood of the protection transistor 7 and in the intersectional portion of wiring lines in the frame portion can be reduced. Therefore, in the second example, it is not necessary to provide the light shielding layer such as the black matrix in the opposed substrate. Thereby, cost reduction of the high-quality active matrix liquid crystal display device using the transparent electrode can be achieved.

Third Example

Figure 11:
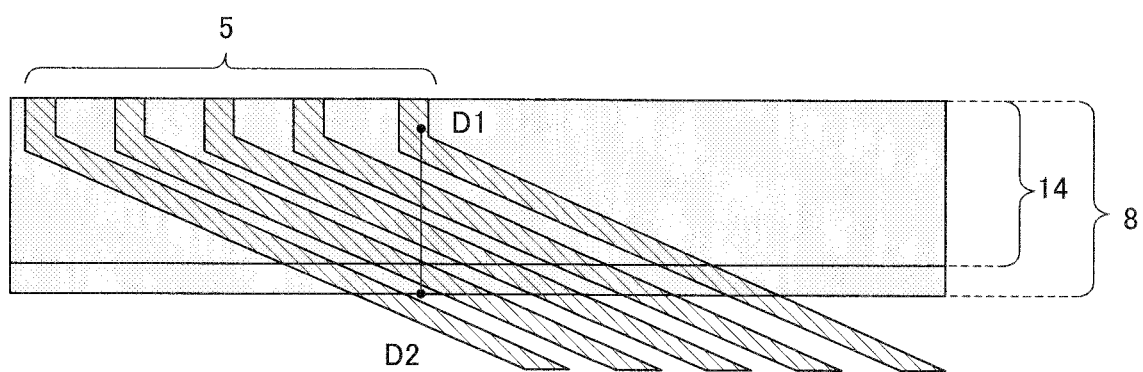
FIG. 11 is a plan view illustrating a structure of the frame portion of the active matrix liquid crystal display device according to a third example of the present invention.
Figure 12:
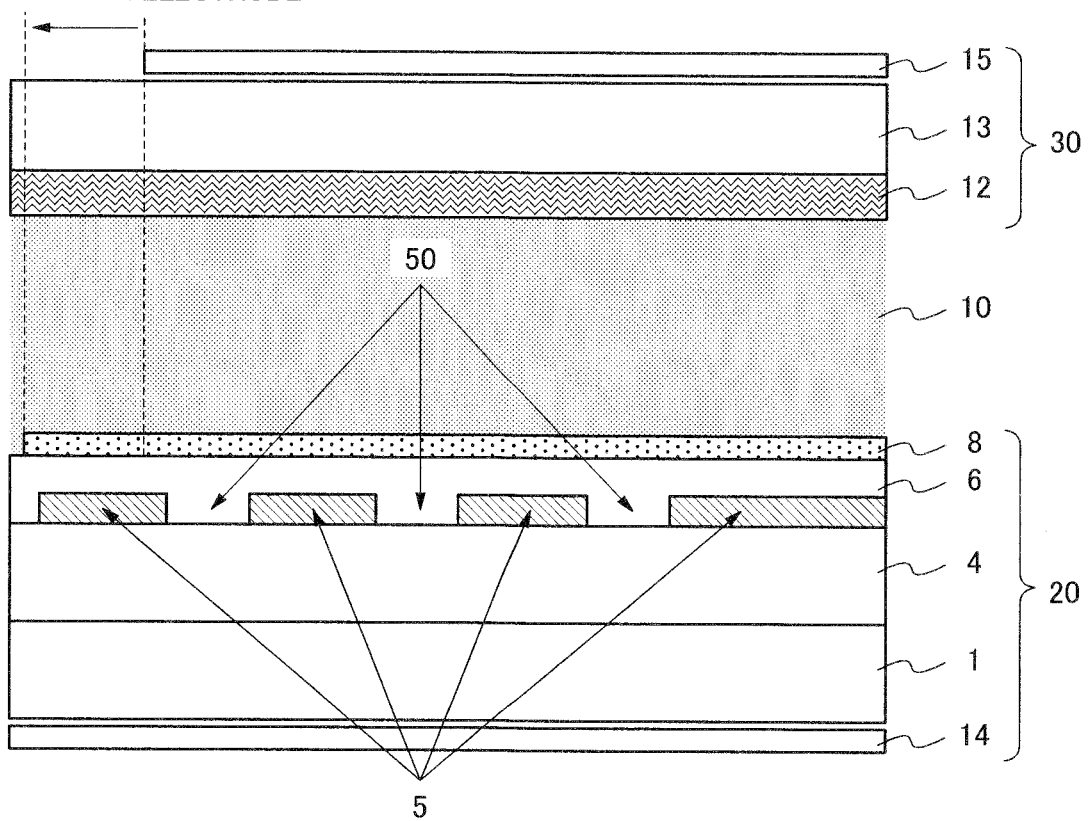
FIG. 12 is a cross-sectional view illustrating a cross-sectional structure of a line D1-D2 in FIG. 11.
Figure 13:
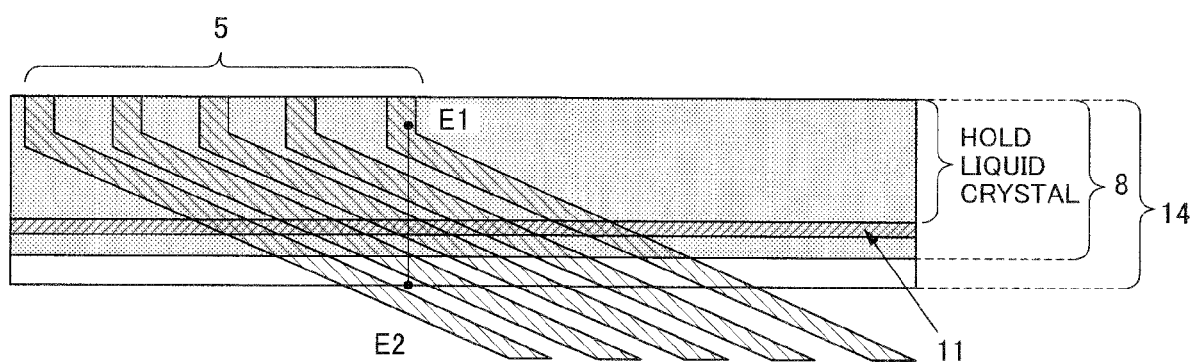
FIG. 13 is a plan view illustrating a structure of a surrounding frame portion of the active matrix liquid crystal display device according to the third example of the present invention.
Figure 14:
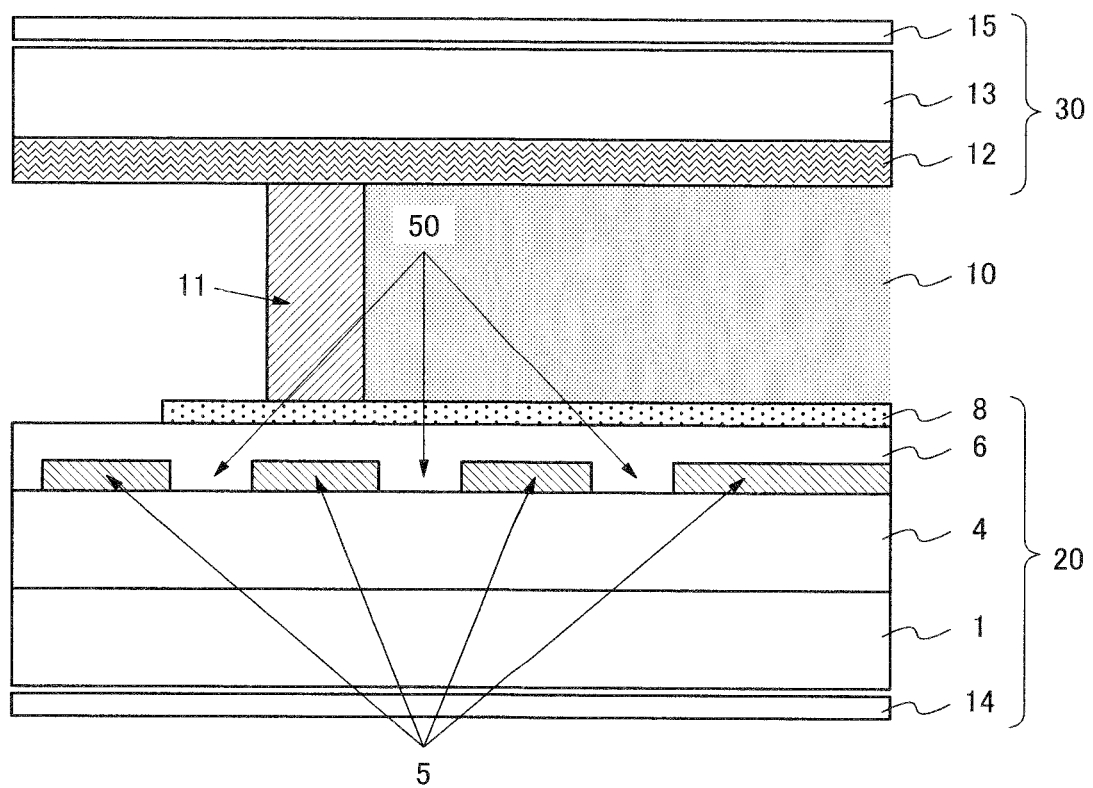
FIG. 14 is a cross-sectional view illustrating a cross-sectional structure of a line E1-E2 in FIG. 13.

Next, an active matrix liquid crystal display device according to a third example of the present invention will be described with reference to FIGS. 11 to 14. FIG. 11 is a plan view illustrating a structure of the frame portion of the active matrix liquid crystal display device according to a third example. FIG. 12 is a view illustrating an intersectional structure of a line D1-D2 in FIG. 11. FIG. 13 is a plan view illustrating another structure of the frame portion of the active matrix liquid crystal display device according to a third example. FIG. 14 is a view illustrating an intersectional structure of a line E1-E2 in FIG. 13.

In FIG. 2 of the above-mentioned first example, as shown in FIG. 11 and FIG. 12, an edge of the constant-potential transparent electrode 8 can be extended to the outside of an edge of the polarizing plate 15. As a result, the electric field is shielded in the whole area which is covered by the polarizing plate 15 in a surrounding area. Therefore, a high-quality liquid crystal display device in which the light leakage from the surrounding area does not occur can be provided.

Similarly, in FIG. 2 of the first example, as shown in FIG. 13 and FIG. 14, the edge of the constant-potential transparent electrode 8 can be extended to the outside of the end seal 11. As a result, the electric field can be shielded in the whole areas in which a liquid crystal is held in the surrounding area and the high-quality liquid crystal display device in which the light leakage from the surrounding area does not occur can be provided.

Fourth Example

Figure 15:
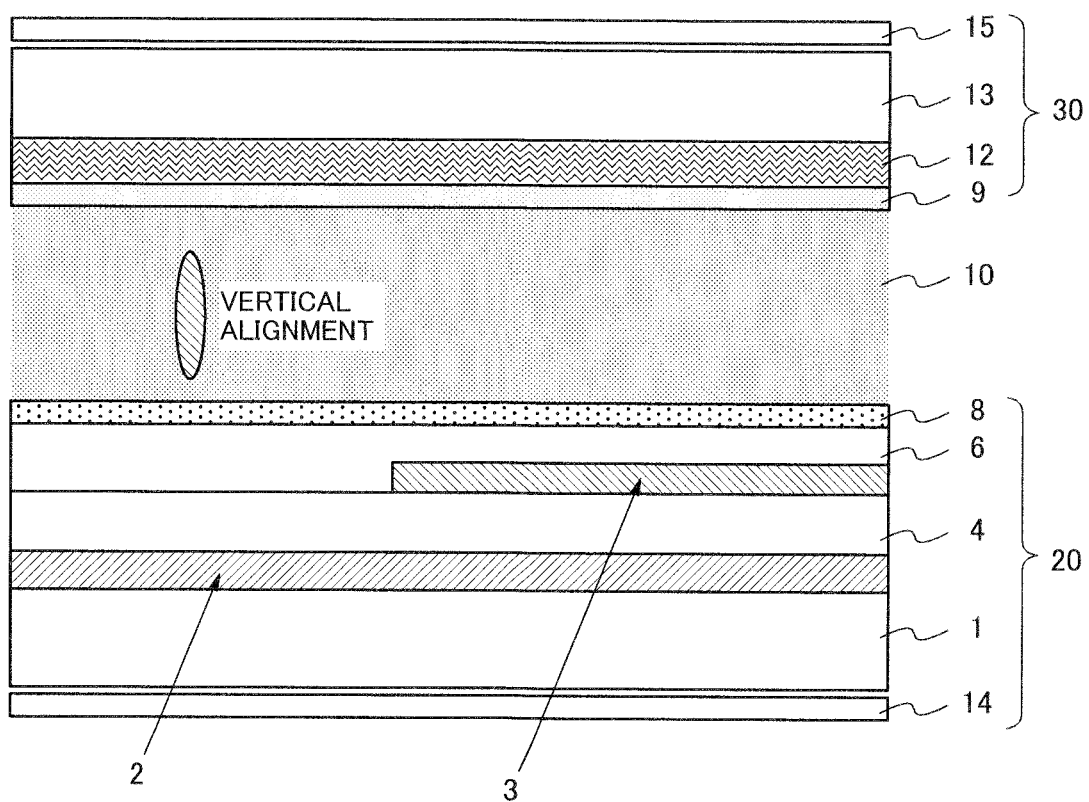
FIG. 15 is a cross-sectional view illustrating a structure of the frame portion around a display area of the active matrix liquid crystal display device according to a fourth example of the present invention.
Figure 16:
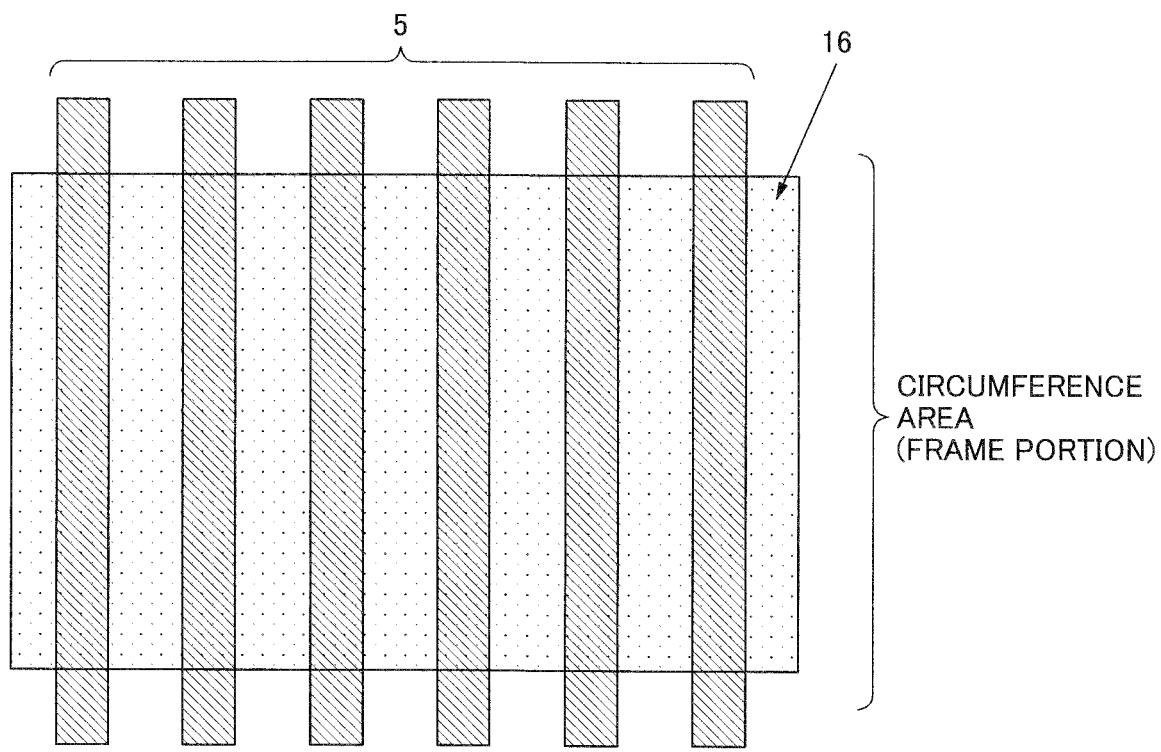
FIG. 16 is a plan view schematically illustrating a structure of a frame portion of a liquid crystal display device of a related art (patent document 1).
Figure 17:
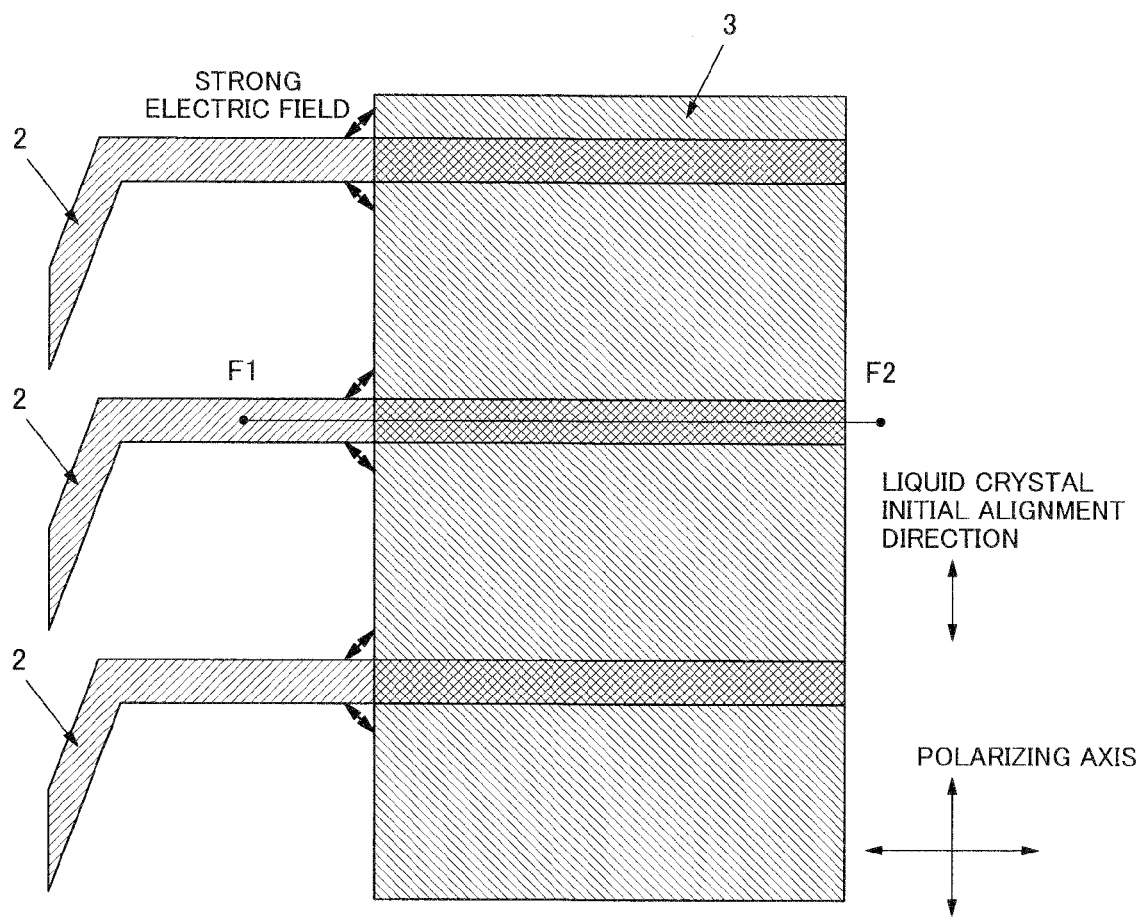
FIG. 17 is a plan view illustrating an electric field which is generated to an intersectional portion of wiring lines of a frame portion of a liquid crystal display device of a related art.
Figure 18:
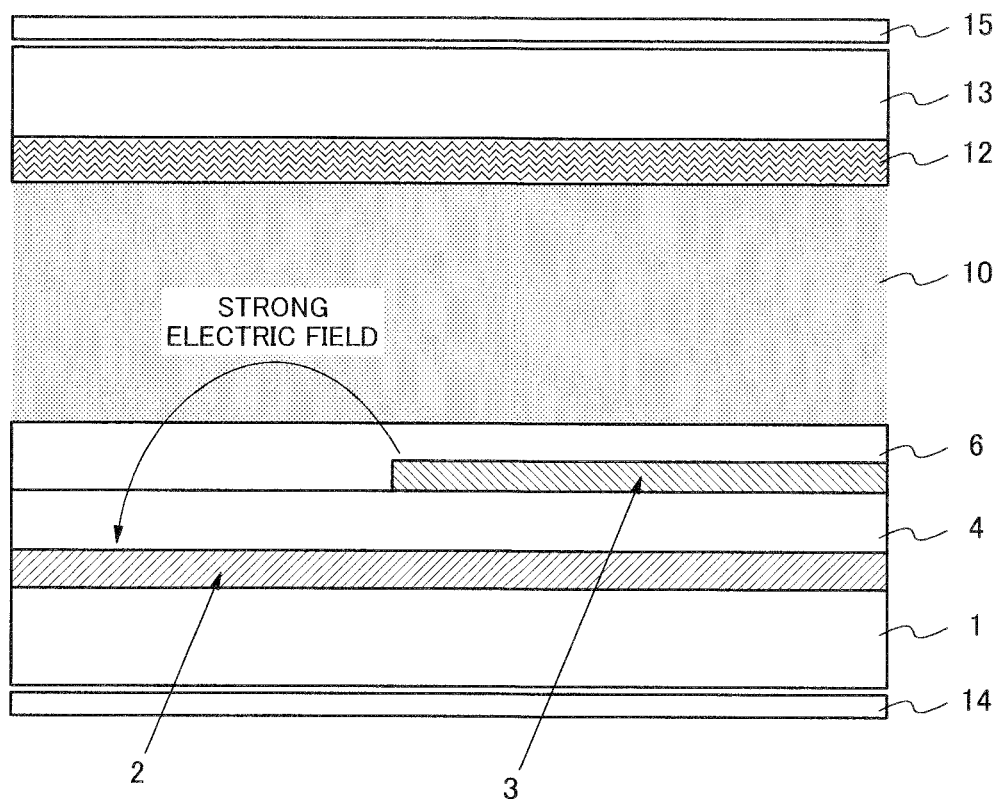
FIG. 18 is a cross-sectional view illustrating a cross-sectional structure of a line F1-F2 in FIG. 17.

Next, an active matrix liquid crystal display device according to a fourth example of the present invention will be described with reference to FIG. 15. FIG. 15 is a cross sectional view illustrating a structure of the active matrix liquid crystal display device according to the fourth example.

In the example mentioned above, the structure of the present invention is applied to a liquid crystal display device which is of the lateral electric field type is described. However, the present invention can also be applied to a liquid crystal display device that is of a vertical alignment and the normally black.

For example, as shown in FIG. 15, in the frame portion around the display area, the constant-potential transparent electrode 8 is provided in the active matrix substrates 20 and also the constant-potential transparent electrode 9 having the same electric potential as that of the constant-potential transparent electrode 8 is provided in the opposed substrate 30. Thereby, the electric field can be shielded in the whole areas in which a liquid crystal is held in the surrounding area and the electric field is not applied to the liquid crystal layer 10. Therefore, with respect to the liquid crystal display device that is of the vertical alignment, a high-quality active matrix liquid crystal display device in which a light shielding layer that is composed of a black matrix is not provided in the opposed substrate can be realized, and the production cost can be reduced.

Further, in each of the above-mentioned examples, the liquid crystal display device having the structure in which the scanning line 2 is provided in a lower layer side and the signal line 5 is provided in an upper layer side is described. The present invention is not limited to the above-mentioned examples and the present invention can be applied to a liquid crystal display device having the structure in which the scanning line 2 is provided in an upper layer side and the signal line 5 is provided in a lower layer side.

The present invention can be applied to the active matrix liquid crystal display device, a monitor for a computer using the active matrix liquid crystal display device, a liquid crystal television, a mobile phone, a GPS (Global Positioning System) terminal, a car navigation system, a game machine, a terminal for a bank and a convenience store, medical diagnostic equipment or the like.

In the active matrix liquid crystal display device of the normally black mode of the present invention, light leakage in the frame portion around the display area can be reduced. This is because when a gap between the opaque electrodes which are closely located and whose electric potentials are different from each other is covered with a constant-potential transparent electrode provided in an upper layer in the frame portion, the electric field generated between the opaque electrodes is shielded and undesired rotation of the liquid crystal can be prevented.

By the above-mentioned advantage, it is not necessary to provide a light shielding layer such as the black matrix in the opposed substrate. Therefore, production cost can be reduced.

While the invention has been particularly shown and described with reference to exemplary embodiment and examples thereof, the invention is not limited to these embodiment and examples. It will be understood by those of ordinary skill in the art that various changes in form and details may be made therein without departing from the spirit and scope of the present invention as defined by the claims.

Further, it is the inventor's intention to retain all equivalents of the claimed invention even if the claims are amended during prosecution.

What is claimed is:

1. An active matrix liquid crystal display device of a normally black mode, comprising:
    an active matrix substrate; and
    an opposed substrate, in which a black matrix is not provided on said opposed substrate,
    wherein the opposed substrate includes a color layer at a position corresponding to a frame portion around a display area of said active matrix substrate,
    wherein said active matrix substrate includes a protection transistor provided in the frame portion, said protection transistor being configured to discharge electric charge when a static electrical charge is generated in a signal line provided in the frame portion, and
    wherein a part of an edge of said protection transistor is covered with a transparent electrode arranged above said protection transistor.

2. The active matrix liquid crystal display device claimed in claim 1, wherein in an extraction side of said frame portion from which a scanning line is extracted, said scanning line is connected to said opaque electrodes composed of a metal forming signal lines, said opaque electrodes are extended in a direction substantially orthogonal to a direction in which said scanning line is extended and overlap with one of said scanning lines adjacent to said connected scanning line, and a part of an edge of said constant-potential transparent electrode is arranged above said opaque electrodes.

3. The active matrix liquid crystal display device claimed in claim 1, wherein a part of an edge of said constant-potential transparent electrode is arranged outside an edge of a polarizing plate provided in said active matrix substrate side or said opposed substrate side.

4. The active matrix liquid crystal display device claimed in claim 1, wherein a part of an edge of said constant-potential transparent electrode is arranged outside an end seal which seals a liquid crystal sandwiched between said active matrix substrate and said opposed substrate.

5. The active matrix liquid crystal display device claimed in claim 1, wherein a protection transistor is provided in said frame portion, said constant-potential transparent electrode includes a through-hole part which is formed so as to avoid overlapping with a channel part of said protection transistor, and an edge of said through-hole part is arranged so as to overlap with a gate electrode of said protection transistor.

6. The active matrix liquid crystal display device claimed in claim 1, wherein a liquid crystal which is vertically aligned is sandwiched between said active matrix substrate and said opposed substrate, and a transparent electrode having the same electric potential as that of said constant-potential transparent electrode in said active matrix substrate is arranged in said opposed substrate side.

7. The active matrix liquid crystal display device claimed in claim 1, wherein said liquid crystal display device is an IPS system liquid crystal display device or a VA system liquid crystal display device.

8. An active matrix liquid crystal display device of normally black mode, comprising:

an active matrix substrate; and an opposed substrate, wherein a black matrix is not provided on said opposed substrate, wherein, in a cross-sectional view, said active matrix substrate includes a protection transistor at a frame portion thereof, said protection transistor being configured to discharge electric charge when a static electrical charge is generated in a signal line provided in the frame portion, wherein a part of an edge of said protection transistor is covered with a transparent electrode located above said protection transistor, wherein, in the cross-sectional view, the transparent electrode includes a through-hole part above said protection transistor, wherein, in the cross-sectional view, an edge of the through-hole part is located above the protection transistor, and wherein, in the cross-sectional view, a part of an edge of the transparent electrode is located above the protection transistor.

9. The active matrix liquid crystal display device as claimed in claim 1, wherein the transparent electrode overlaps with the protection transistor by at least 1 μm.

10. The active matrix liquid crystal display device as claimed in claim 8, wherein the transparent electrode overlaps with the protection transistor by at least 1 μm.

* * * * *